United States Patent

Tavernier et al.

[11] Patent Number: 5,981,128
[45] Date of Patent: Nov. 9, 1999

[54] DRY TONER PARTICLES COMPRISING A COMPLEX AMORPHOUS MACROMOLECULE AS TONER RESIN

[75] Inventors: Serge Tavernier, Lint; August Mariën, Westerlo; Werner Op de Beeck, Keerbergen, all of Belgium

[73] Assignee: Agfa-Gevaert, N.V., Mortsel, Belgium

[21] Appl. No.: 08/922,362

[22] Filed: Sep. 3, 1997

Related U.S. Application Data

[63] Continuation of application No. 08/554,655, Nov. 8, 1995, abandoned.

[30] Foreign Application Priority Data

Nov. 15, 1994 [EP]  European Pat. Off. ............ 94203323

[51] Int. Cl.[6] .................................................. G03G 9/087
[52] U.S. Cl. .......................................... 430/109; 525/148
[58] Field of Search .................................. 430/106, 109, 430/110; 525/148

[56] References Cited

U.S. PATENT DOCUMENTS

| | | | |
|---|---|---|---|
| 3,967,962 | 7/1976 | O'Malley | 430/96 |
| 4,758,626 | 7/1988 | Ishihara et al. | 525/148 |
| 4,940,644 | 7/1990 | Matsubara et al. | 430/109 |
| 5,578,409 | 11/1996 | Kotaki et al. | 430/109 |

FOREIGN PATENT DOCUMENTS

| | | |
|---|---|---|
| 0220319 | 5/1987 | European Pat. Off. . |
| 0298214 | 1/1989 | European Pat. Off. . |
| 0 606 873 A1 | 7/1994 | European Pat. Off. . |

OTHER PUBLICATIONS

Patent Abstracts of Japan, vol. 14, No. 30, Jan. 19, 1990; and.

Derwent Abstract No. 89–359926[49] re JP 1268722, Oct. 26, 1989.

*Primary Examiner*—John L Goodrow
*Attorney, Agent, or Firm*—Breiner & Breiner

[57] ABSTRACT

An amorphous complex macromolecular compound is provided hat comprises in its macromolecular structure, (i) an amorphous polycondensation backbone, the corresponding backbone polymer having a Tg of at least 45° C. and (ii) at least one polymer chain attached to the backbone, either terminally and/or in a side-chain, this polymer chain being derived from a polymer which on itself has an average molecular weight by number ($M_{avg}$) so that $400 \leq M_{avg} \leq 4000$, a melting point between 50° C. and 150° C. and a melting range of at most 15° C.

There are also provided methods for the production of the amorphous complex macromolecular compound.

Further are provided toner particles and toner receiving substrates comprising the amorphous complex macromolecular compound mentioned above.

13 Claims, 1 Drawing Sheet

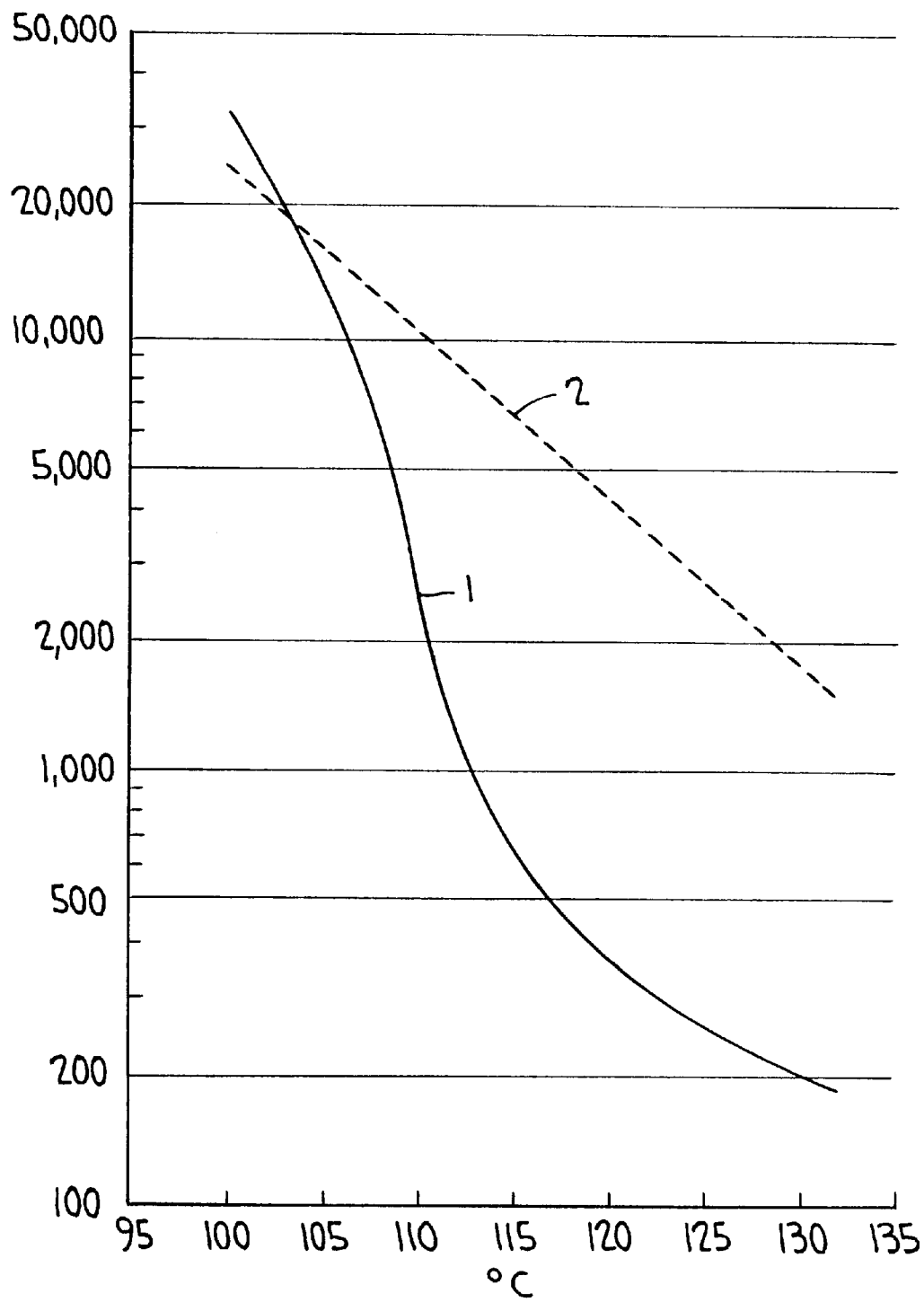

DRY TONER PARTICLES COMPRISING A COMPLEX AMORPHOUS MACROMOLECULE AS TONER RESIN

This is a continuation of application Ser. No. 08/554,655 filed Nov. 8, 1995 now abandoned.

DESCRIPTION

1. Field of the Invention

This invention relates to amorphous multiphase polycondensation polymers wherein crystallizable moieties are (co)polycondensed. The invention relates also to a production method for said amorphous multiphase polycondensation polymers and to image forming methods wherein polymeric particulate material, comprising said novel polycondensation polymers, is used to develop an image and is fixed onto a final substrate. The present invention relates in particular to the use of the novel polycondensation polymers in electrically or magnetically based imaging methods as, e.g. electro(photo)graphy, magnetography, direct electrostatic printing (DEP), ionography, etc.

2. Background of the Invention

In imaging methods as e.g. electro(photo)graphy, magnetography, ionography, etc. a latent image is formed that is developed by attraction of so called toner particles. In DEP the so called toner particles are imagewise deposited on a substrate. Toner particles are basically polymeric particles comprising a polymeric resin as main component and various ingredients mixed with said toner resin. Apart from colourless toners, which are used e.g. for finishing function, the toner particles comprise at least one black and/or colouring substances, e.g., couloured pigment.

In the different imaging methods, described above, the toner particles can be present in a liquid or in a dry developer composition.

In most cases the use of dry developer compositions is preferred. The main advantage of using a dry developer composition resides in the absence of the need to eliminate the liquid phase after development. The avoidance of the need to evacuate (mainly organic) liquids is desirable both from an economical standpoint and from an ecological standpoint.

The major problem in using dry development systems instead of liquid development systems has longtime resided in the fact that the dry toner particles could, in an economically sound way, only be produced with large particle sizes. The large particle size of toner particles has limited the image resolution that was attainable by dry development systems when compared to liquid development systems. The preparation methods for toner particles have however evolved in such a way that dry development systems can now be used for high resolution imaging.

Further advancement in technology, e.g. the amount of gray levels that can be contained in an image, the use of colored particles, etc. has made the imaging techniques, described above, reliable enough to realize high quality colored images, comparable in quality to the quality of offset printing and of conventional (silver halide) color images with the additional advantage that these images can be realized on different substrates such as paper, transparencies, plastics etc . . . .

It moreover offers the possibility to create images at high speed and double sided and combinig high resolution text with images comprising a large amount of gray levels. It offers with respect to thermosublimation imaging systems excellent resolution and fine gray rendition at high speed.

However, in all techniques using dry particulate material to form an image, the images are built up by application of particulate marking elements in multiple, superimposed layers onto the final substrate. The problems associated with multiple, superimposed layers of particulate marking particles that are in one way or another fixed on a substrate are manifold, not only with respect to image quality but also with respect to image stability and with respect to mechanical issues. E.g. superimposed layers can only give brilliant mixed colors when the different particles having a different color are intimately mixed. When fusing and flowing of the particles are sub-optimal, some microporosity remains in the image, giving rise to light scattering and to mixing white light with the image colors diminishing the color intensity (saturation). When the flow of the molten toner is not sufficient, some relief pattern remains in the image, which gives rise to differences in gloss. When the flow of the molten toner is not sufficient, the image, formed by superimposed layers of toner particles, is present as a thick layer. Thick layers will give more mechanical stress in the image, inducing curl, cracks, etc . . . , thick layers are more fragile so that rubbing, folding etc . . . , make the final image more sensitive towards deterioration after processing.

It is thus necessary that in the fixing step of the image on the final substrate means should be found to mix the different superimposed toner particles intimately and to diminish the overall thickness of the image layer.

In most of the fixing steps of toner particles heat is involved in one way or another (e.g. pressure and heat fixing, oven fixing, IR (infrared) radiation fusing, etc.).

It has been recognised that by modifying the toner resin, it was possible to produce toner particles which made it possible to have an image with well mixed colors and with a thin image layer.

The main property needed in a toner resin, which makes it possible to have an image with well mixed colors and with a thin image layer, is a good melt fluidity (i.e. low melt viscosity) at quite low fixing temperature.

It is possible to lower the melt viscosity during the fusing process when using fairly high fixing temperatures. This means compromising on power consumption or on copy speed for a given toner resin. Moreover the usable fixing temperature is limited by the thermal properties of the final substrates whereon the toner particles are fixed. Too high fixing temperature can result in yellowed paper, wrinkled transparencies, etc.

The other possibility to lower the melt viscosity of toner particles lies in the design of the toner particles, especially in designing the toner resin with respect to its melting point. The melting 'point' of the toner, depending mainly on the melting point of the toner resin, however can not be lowered without lowering in a pronounced way the glass rubber transition temperature (Tg) of the toner resin. Lowering that temperature however induces the deterioration of the toner marking particles and marking system due to the fact that the toner particles will be, at room or slightly higher temperature, too weak to overcome deformation, smearing, etc. by the mechanical forces exerted on the toner particles in the development units.

In most imaging systems, now available on the market place, the toner particles comprise more or less sofisticated toner resins, but the compromise between Tg and melt temperature and melt viscosity is in most commercial toner particles rather fragile. In most systems, still an appreciable amount of fusing energy is needed and high fusing temperatures are not uncommon, even when Tg of the toner resin is chosen marginally low, reducing developer lifetime and image quality upon prolonged use.

In order to optimize the compromise between Tg and melt viscosity of toner resins, more sofisticated polymers are described as being useful as toner resin. The major concept is to use a multicomponent macromolecule as toner resin. In such a multicomponent macromolecule, polymeric moieties, having different properties, are combined to give a final macromolecule showing a compromise between Tg and melting behaviour that can depend on the nature of the polymeric moieties that are combined in the same macromolecule.

In NL 73-00096 a crystalline multicomponent macromolecule is disclosed, comprising an amorphous backbone and a high content of crystalline polymeric side-chains. The amount of crystalline side-chain is chosen such as to produce a final crystalline macromolecule. Such a crystalline macromolecule shows a sharp melting point, ranging at most over 10° C. Although the macromolecules, disclosed in NL 73-00096, show, when used as toner resin, advantages over pure crystalline homopolymers (e.g. toners comprising said macromolecules have lower dark decay and low conductivity), they tend to have the typical crystalline fracture mechanics. Because of these fracture mechanics, toner particles comprising said macromolecules and produced by a melt kneading and milling, have flat, good aligning fractured surfaces, these surfaces giving rise to strong cohesion, strong adhesion, low flow and poor individual particle behaviour. These problems make toner particles, comprising the above mentioned macromolecules, of limited use for high resolution halftone imaging.

The crystallinity of said macromolecules diminishes greatly the compatibility of the macromolecules with a host of toner ingredients. This makes them also less suited as universal toner resin since the use of them limits the freedom for chosing other toner ingredients.

In EP-A 099 140 a multicomponent macromolecule comprising immiscible crystalline and amorphous blocks is taught as toner resin. The crystalline blocks form the continuous phase of the macromolecule and have a melting point between 45 and 90° C. The amorphous blocks have a Tg at least 10° C. higher than said crystalline blokcs. The crystalline blocks are present in the macromolecule for at least 65% by weight and for at most 95% by weight. Also this macromolecule is basically crystalline and shows the same drawbacks of crystalline macromolecules as explained above.

In EP-A 220 319 the use as toner resing of a block polymer comprising amorphous and crystalline blocks has been described. It is preferred that both the amorphous and crystalline blocks are polyester resins.

In JP-A 01 268,722 a preparation method for polyesters, that are intended to be used as binder in paints, has been described. The polyester is prepared by copolycondensation with polyolefins in low concentration, about 2% by weight.

In EP-A 477 512 and corresponding U.S. Pat. No. 5,158, 851 and U.S. Pat. No. 5,238,998 it is disclosed to use as a toner resin a complex macromolecule having a general formula $(A-B)_n$, wherein n is at least 2 and A and B represent different polymeric segments. It is intented to form a liquid glass macromolecule. In this type of polymers, at least one of the polymeric segments is a glassy segment with a Tg higher than room temperature, preferably higher than 50° C. and the other segment is a liquid polymer having a Tg lower than room temperature. In these resins the mobility of the liquid segments is frozen by the glassy segments at a temperature below the Tg of the latter. The mobility is high at temperatures above said Tg. Although the compromise between Tg and melting behaviour of these macromolecules is better than with the mainly crystalline macromolecules mentioned above, there are still some problems associated with the use of said macromolecules as toner resin. Some of these problem are: The preparation of said macromolecules is quite complex, the melt flow behaviour is Tg controlled which is an inherently unsharp process (the crystalline macromolecule referred to above exhibits a sharp melting behaviour). The choice of and the amount of useful glassy segments to be combined with the liquid segments is limited, due to the fact that the liquid segments have a strong softening influence on the macromolecule and that the glassy segments must have an sufficiently high Tg to give an acceptable Tg to the complex macromolecule. The Tg of the complex macromolecule has to be high to overcome deformation, smearing, etc. by the mechanical forces exerted on the toner particles in the development units. But by increasing the Tg of the complex macromolecule by using a fair amount of glassy segments with high Tg the melt flow characteristics are worsened and the complex macromolecule shows again a labile compromise between Tg and melt flow characteristics.

In U.S. Pat. No. 3,967,962 it is disclosed to have a segmented copolymer as toner resin, said segmented copolymer comprising one crystalline or crystallizable polymeric segment chemically linked to at least one amorphous isomeric polymeric segment. The segmented copolymer has a Tg lower than 20° C. and a melting point higher than 45° C. It is preferred that the melting range is between 45 and 150° C. The segments, forming the segmented element, need to have low Tg: the crystallizable segment has a Tg between 20° C. and −100° C., the amorphous segment need to have a Tg lower than 45° C.

It is the object of the disclosure in U.S. Pat. No. 3,967,962 to provide a toner resin with low melting point and good hot off-set properties. Therefore it is proposed to combine a crystalline (or crystallizable polymer) with an amorphous polymer into one complex macromolecule that has to remain crystalline. It is clear that a toner comprising such a toner resin will have desirable melt viscosity characteristics, but due to the low Tg, problems with deformation, smearing, etc. by the mechanical forces exerted on the toner particles in the development units will occur to a large extent.

In U.S. Pat. No. 5,166,026 a copolymer of eicosene with styrene is disclosed to give a toner resin with an acceptable compromise between Tg and melt flow characteristics.

In U.S. Pat. No. 5,026,621 a block copolymer, comprising fluoroalkylacrylester moieties are disclosed as useful as toner resin for the cited reasons.

The disclosures, mentioned earlier on, are mainly concerned in modifying crystalline polymers and are also, apart from U.S. Pat. No. 3,967,962, mainly concerned with addition polymers. The teachings do not extend to the use of amorphous modified polycondensation resins, altough amorphous polycondensation resins do offer advantages when used as toner resin.

The addition polymers are reasonable good binders but do not offer the major advantages of the polycondensation type resins, especially of polyester resins. Polyester type resins offer a combination of good basic electrostatic properties, good optical clearness and good dispersing power for toner ingredients. Therefore these polyester type resins are the preferred resins for high quality applications, such as full color applications. Polyesters, moreover, offer already in the amorphous state a good starting point for a fair balance between Tg and melt behaviour. However teachings on the manufacture of amorphous complex polycondensation macromulecules and their use as toner resins have not been found.

The process of manufacture of the addition polymers, described in the documents mentioned above, is not an easy one or does not deliver well defined complex macromolecules.

The methods for the production of complex addition macromolecules are typical block and graft procedures known in the art. Typical methods are radical polymerisation, anionic or cationic polymerisation, group transfer polymerisation as described in, e.g., Journal of Coatings Technology Vol. 59, No 752 pages 125 to 131 and EP-A 068 887, pseudo living free radical polymerisation as disclosed in, e.g. WO 94/11412 and latex grafting. Although all these metods are useful for making block or graft polymers, the practical use is often limited mostly due to the complexity and cost of the production process. In ionic polymerisation methods and in group transfer polymerisation methods, the purity of the monomers and the solvents, the low reaction temperature and high vacuum needed limit the possibilities of this technique. The use of organic solvents makes these methods also less attractive from an ecological point of view.

In pseudo living free radical polymerisation methods the main drawback lies in the long reaction times, that can extend from one day to several weeks.

With latex grafting methods it is almost impossible to have pure block polymers, since in most cases there will always be a part of homopolymer present.

The synthesis of blockcopolymers, as disclosed in U.S. Pat. No. 3,967,962, by the coupling of mono and/or bifunctional polymer segments to each other by the reaction of a bifunctional low molecular weight product, preferably a diisocyanate, is a simpler method to form blockcopolymers. Unfortunately this method delivers a mixture of final blockcopolymers, of which the structure can not easily be predetermined, and of homopolymers consisting of several equal segments linked together. Moreover after completion of the reaction, the polymer mixture has to be purified and the unreacted diisocyanate has to be extracted by organic solvents, which again is undesirable from an ecological point of view.

In EP 298 214 a reaction, presumably an ester interchange reaction, is described to provide a macromolecule comprising polyester and polyacrylate moieties. The product formed seems to be rather a new composition (mixture) wherein the two components are intimately admixed instead of a new macromolecule.

There is thus still a need to have resins available that combine relatively high Tg with good melt fluidity (low melt viscosity) at fairly low melting temperature and that are mainly modified complex polycondensation macromolecules, especially modified polyester resins. There is moreover still a need for an easy, simple and cost-efficient procedure for manufacturing such complex polycondensation macromolecules that makes it also possible to taylor a macromolecule to the particular needs of toner particles to be used in each particular imaging system.

OBJECTS AND SUMMARY OF THE INVENTION

It is an object of the present invention to provide amorphous complex macromolecules, that are modified polycondensation resins, combining a relatively high Tg with good melt fluidity (low melt viscosity) at fairly low melting temperature.

It is an other object of the present invention to provide dry toner particles that are mechanically strong at room temperature and have a low melt viscosity.

It is another object of the invention to provide dry toner particles comprising at least one amorphous complex macromolecular compound, having a favourable compromise between Tg and melt viscosity, as toner resin.

It is a further object of the invention to provide colorless toner particles, comprising at least one of the above mentioned amorphous complex macromolecular compounds, that can be used as to form a protective layer on an image.

It is another object of the present invention to provide a method to produce the above mentioned amorphous complex macromolecular compounds that is both simple, fast, cost-effective and flexible.

It is still a further object of the invention to provide sheets or web materials comprising at least one coated layer comprising the above mentioned amorphous complex macromolecular compounds whereon toner particles are more easily fused.

Further objects and advantages of the invention will become clear from the detailed description hereinafter.

The objects of the invention are realized by providing an amorphous complex macromolecular compound that comprises in its macromolecular structure, (i) an amorphous polycondensation backbone, the corresponding backbone polymer having a Tg of at least 45° C. and (ii) at least one polymer chain being attached to said backbone, either terminally and/or in a side-chain, said polymer chain being derived from a polymer which on itself has an average molecular weight by number ($M_{avg}$) so that $400 \leq M_{avg} \leq 4000$, a melting point between 50° C. and 150° C. and a melting range of at most 15° C.

In a preferred embodiment, said polymer chain is attached to said backbone polymer over a connecting group being a member selected from the group consisting of an ester of a carboxylic acid, an ester of a sulphonic acid, an ether, an amide of a carboxylic acid, an amide of a sulphonic acid, an urethane and an anhydride group.

In a more preferred embodiment, said polymer chain is attached to said backbone polymer over an ester group of a carboxylic acid.

In a further preferred embodiment said polymer chain on itself has an average molecular weight by number ($M_{avg}$) so that $500 \leq M_{avg} \leq 2500$.

In a still further preferred embodiment said polymer chain is a polyolefine.

BRIEF DESCRIPTION OF THE DRAWING

In the sole FIGURE, the meltviscosity of a polymer according to the present invention and of a comparative polymer as a function of the temperature is shown.

DETAILED DESCRIPTION OF THE INVENTION

The problems associated with the particulate structure of dry toner and the limited fusing properties can be overcome by the design and use of polymeric resins as toner resin which offer an improved balance between the mechanical deformability at ambiant and slightlty elevated temperatures as present in the operating engine and an improved fusibility at lower temperatures (this means a low melt viscosity at relatively low temperatures).

This can be achieved by providing for use as toner resin, a macromolecule, having an improved balance between a high Tg and at the same time a low melting point and a low melt viscosity at typical temperatures useful for the fusing process.

It has been found that toner particles comprising a complex macromolecule, comprising an amorphous polymeric backbone, and attached thereto crystalline and/or crystallizable terminal and/or side-chains, as toner resin show an improved balance between the mechanical deformability at ambiant and slightlty elevated temperatures as present in the operating engine and an improved fusibility at lower temperatures (this means a low melt viscosity at relatively low temperatures).

This improvement is more remarkable when the complex macromolecule, used as toner resin, is designed in such a way and selected from specific subcomponents that the crystallizable terminal chains and/or side-chains indeed do interact with themselves, giving rise to ordered regions rich in terminal chains and/or side-chain randomly distributed over an non-ordered amorphous structure.

The amount of crystallizable terminal chain and/or side-chain is preferably chosen in such a way that the complex macromolecule remains basically amorphous.

Such a basically amorphous complex macromecule, comprising crystallizable terminal chains and/or side-chains, gives an extremely interesting situation wherein at low temperatures the terminal chain and/or side-chains do not weaken the macromolecular structure by softening action on the amorphous complex macromolecule and even on the contrary will strengthen the structure by the fact that the structured region will behave as a finely divided filler. Thus as an overall effect the Tg of the complex macromolecule will, in most instances, not be lower than that of the amorphous backbone but, on the contrary, will likely rise with respect to the pure amorphous backbone.

At elevated temperatures however, the ordered (crystalline) regions melt and the liquified terminal chain and/or side-chains will soften the matrix of the complex amorphous macromolecule in an appreciable amount, thus inducing a remarkable drop in the melt viscosity of the complex amorphous macromolecule, and thus imposing in a macroscopic way a sharp melt behaviour of the total matrix of the complex amorphous macromolecule. Due to this effect a remarkable drop of melt viscosity of the complex amorphous macromolecule is observed with respect to the amorphous backbone polymer. This drop gives an immediate effect on the fusing properties of the toner particles comprising said complex amorphous macromolecule as a major constituent. The combination of all cited effects gives rise to an unique situation of better compromise between Tg and melt viscosity.

It has been found that amorphous polycondensation polymers could be modified in a simple way to provide basically amorphous macromolecules, comprising crystalline or crystallizable moieties and having a more favourable relation between Tg and melt viscosity. The method, according to the present invention, for modifying amorphous polycondensation polymer is a simple, well controlable, relatively fast, chemical reaction, needing no complex dosing of reaction ingredients during the reaction period. The chemical reaction takes basically place between reactive groups comprised in said amorphous polycondensation polymer and a reactive group comprised in the monofunctional crystalline or crystallyzable polymers that will be attached (grafted) to the backbone.

Such modified amorphous polycondensation polymers, forming complex amorphous macromolecular compound, are characterised in that they comprise in their macromolecular structure, (i) an amorphous polycondensation backbone, the corresponding backbone polymer having a Tg of at least 45° C. and (ii) at least one polymer chain attached to said backbone, either terminally and/or in a side-chain polymer, said polymer chain being derived from a polymer which on itself has an average molecular weight by number ($M_{avg}$) so that $400 \leq M_{avg} \leq 4000$, a melting point between 50° C. and 150° C. and a melting range of at most 15° C.

The amorphous polycondensation backbone, in complex amorphous. macromolecules according to the present invention, is preferably a polyester, an epoxy resin or a mixed polycondensate (block or random polymer) comprising polyester and polyamide moieties. Mixed polycondensates, comprising polyester and polyamide moieties, can be prepared by copolycondensation of at least one di- or polycarboxylic acid, at least one diol or polyol, and at least one aliphatic diamine or aminocarboxylic acid or a lactam. Said diamine, aminocarboxylic acid or lactam is present in the polycondensation mixture for at most 30% mol for mol. Examples of useful diamines, aminocarboxylic acids or lactam are e.g. hexamethylene diamine, pentamethylene diamine, tetramethylene diamine, 11-aminoundecanoic acid, ε-caprolactam, etc.

Expoxy resins, useful as polycondensation backbone in a complex macromolecule according to the present invention, are linear adduct of bis-phenol A and epichlorhydrin having a Tg of about 54° C.

Preferably applied epoxy resins are linear adducts of bisphenol compounds and epichlorhydrin as described e.g. by D. H. Solomon in the book "The Chemistry of Organic Film Formers"—John Wiley & Sons, Inc, New York (1967) p. 180–181, e.g. EPIKOTE 1004 (EPIKOTE is a registered trade mark of the Shell Chemical Co).

In the most preferred embodiment the amorphous polycondensation backbone is a homo- or copolyester. Said homo- or copolyesters (herinafter termed polyester) can be produced by any known polycondensation reaction between at least one dicarboxylic acid and one diol. The polyester, used according to this invention can comprise aromatic dicarboxylic acid moieties. Examples of aromatic dicarboxylic acid moieties are moieties of terephthalic acid, isophthalic acid, naphthalene dicarboxylic acids, 4,4'diphenylene dicarboxylic acid, 4,4'diphenylether dicarboxylic acid, 4,4'diphenylmethane dicarboxylic acid, 4,4'diphenylsulphodicarboxylic acid, 5-sulphoisophthalic acid, etc and mixtures of these acid moieties.

Polyesters, forming the backbone of an amorphous complex macromolecular compound according to the present invention, can also comprise aliphatic dicarboxylic acid moieties. It may comprise saturated alifatic dicarboxylic acid moieties derived from, e.g., malonic acid, succinic acid, glutaric acid, adipic acid, etc and/or unsaturated alifatic carboxylic acid moieties derived from, e.g., maleic acid, fumaric acid, etc.

Polyesters, useful for forming the backbone of an amorphous complex macromolecular compound according to the present invention, can be linear or branched. To produce a branched polyester either polycarboxylic acids as, e.g. trimellitic acid, etc. or polyhydroxy compounds, as, e.g., trimethylolpropane, glycerol, pentaerythritol, etc. can be used. Useful polyhydroxycompounds for preparing the polyester backbone of a complex macromolecule according to the present invention are polymers containing hydroxyl groups, said polymers being prepared by polymerisation (as well by suspension polymerisation, as by solution polymerisation, as by blockpolymerization) of olefinic unsaturated monomers. Polymers contaning hydroxyl groups and polyesters comprising the same, as disclosed in WO 93/20129, are also suitable for use in the preparation of the polycondensation backbone of a complex macromolecule according to the present invention or for use as polyester backbone respectively. In the polymers containing hydroxyl groups, as disclosed in WO 93/20129, the hydroxyl groups are introduced via the addition of HO-containing esters of acrylic acid or methacrylic acid, e.g. 4-HO-butyl(meth)acrylate and 2-HO-ethyl(meth)acrylate, to the mixture of monomers.

The polymers disclosed in WO 93/20129 can also be used as polycarboxylic acids in the preparation of the polycondensation backbone of a complex macromolecule according to the present invention, when, instead of hydroxyl groups, carboxylgroups are introduced via the addition of (meth) acrylic acid as monomer to the mixture of monomers.

In polyesters, forming the backbone of an amorphous complex macromolecular compound according to the present invention, diols used to condensate with the di- or polycarboxylic acids, can be either aliphatic or aromatic. Examples of alkylene diol moieties are moieties of ethylene glycol, diethylene glycol, 1,3-propanediol, 1,4-butanediol, 2-methyl-1,5-pentanediol, neopentylglycol, 1,4-cyclohexanedimethanol, p-xylene glycol.

Aromatic diols, useful in a polyester according to this invention are bisfenol A, ethoxylated bisfenol A, propoxylated bisphenol A, etc.

Also mixtures of aliphatic and aromatic diols can be used in a polyester for use in the preparation of an amorphous complex macromolecular compound according to the present invention.

Polyesters, useful for forming the amorphous polycondensation backbone of amorphous complex macromolecular compounds, according to the present invention, have a minimum Tg (glass transition temperature) of 45° C. Any polyester resin having a Tg higher than 45° C. can be used. Preferred polyester resins are linear polycondensation products of (i) difunctional organic acids, e.g. maleic acid, fumaric acid, terephthalic acid and isophthalic acid and (ii) difunctional alcohols such as ethylene glycol, triethylene glycol, an aromatic dihydroxy compound, preferably a bisphenol such as 2,2-bis(4-hydroxyphenyl)-propane called "bisphenol A" or an alkoxylated bisphenol, e.g. propoxylated bisphenol examples of which are given in U.S. Pat. No. 4,331,755. For the preparation of suitable polyester resins reference is made to GB-P 1,373,220.

Interesting linear polyesters are commercial products such as ATLAC T500 (which is a trade name of Atlas Chemical Industries Inc. Wilmington, Del. U.S.A.) and ATLAC T500 is a linear polyester of fumaric acid and propoxylated bisphenol A, having a Tg of about 55° C., and is described in e.g. NL 71/16891. Another useful commercial product for forming the amorphous polycondensation backbone of an amorphous complex macromolecular compound, according to the present invention, is DIACRON FC150 a tradename of Mitsubishi Rayon, Japan for a linear polyester resin produced by the polycondensation of terephthalic acid, propoxylated bisphenol A and ethylene glycol.

Other interesting linear polyesters are polycondensation products of terephthalic acid, isophthalic acid, di-ethoxylated Bisphenol A and ethylene glycol.

Interesting branched polyesters are polyester produced by the polycondensation of DIANOL 22 (di-ethoxylated Bisphenol A), DIANOL 33 (di-propoxylated Bisphenol A), terephthalic acid and trimellitic acid. DIANOL 22 and DIANOL 33 are tradenames of AKZO CHEMIE of the Netherlands. Since the formation of an amorphous complex macromolecular proceeds basically by a chemical reaction between reactive groups comprised in said amorphous polycondensation polymer and a reactive group comprised in the monofunctional crystalline or crystallyzable polymers that will be attached (grafted) to the backbone, both polymers need to have free reactive groups.

The polymer forming the amorphous polycondensation backbone can comprise as reactive groups: hydroxyl groups, carboxyl groups, carboxylic acid halide groups, alkali metal salts of carboxylic acid groups, epoxy groups, isocyanate groups, amino groups, sulphonic acid groups, sulphonylhalide groups, alkali metal salts of sulphonic acid groups. The reactive groups in the amorphous backbone polymer are preferably hydroxyl groups, carboxyl groups, carboxylic acid halide groups and alkali metal salts of carboxylic acid groups.

Polyesters, used for forming the backbone of an amorphous complex macromolecular compound according to the present invention, are most preferably polyesters having an acid value or an hydroxyl value between 5 and 50 mg KOH per g of polyester. Most preferred are polyesters with an acid value or hydroxyl value between 10 and 30 mg KOH per g of polyester.

The choice of the (co)polymer that will form the terminal chain and/or side-chain, in complex macromolecules according to the present invention, is determined by the crystallizability of it. This crystallizability of the terminal chain and/or side-chain polymer, useful according to the present invention, is reflected in the melting point (measured according to ASTM D-127) of it, which is between 50° C. to 150° C. Said melting point of the terminal chain and/or side-chain polymer is preferably between 60 and 150° C., more preferably between 75 and 125° C. It is moreover preferred that the terminal chain and/or side-chain polymer has a sharp melting behaviour, i.e. the transition of a solid polymer to the totally molten polymer will proceed within a range (i.e. have a melting range) of at most 15° C., preferably of at most 10° C. To have enough interaction between the terminal chain and/or side-chain polymers the number average molecular weight ($M_w$) of said polymer is preferably between 400 and 4000, more preferably between 500 and 2500, most preferably between 700 and 2000.

The polymer used to form the crystalline or crystallizable terminal chain and/or side chains in an amorphous complex macromolecular compound, according to the present invention, is preferably a monofunctional polymer (i.e. carries only one reactive group) and most preferably a terminal monofunctinal polymer. Bi- or polyfunctional polymers are preferably avoided for forming the crystalline or crystallizable terminal chain and/or side chains in an amorphous complex macromolecular compound, according to the present invention, because of the fact that such polymers can not only form terminal chain and/or side-chains, but can also react to be grafted between two amorphous polycondensation chains. In such macromolecules the compromise between Tg and melt viscosity is not as good as in amorphous complex molecules wherein the crystallizable or crystalline polymer forms terminal chains and/or side-chains.

The functional group in the polymer used forming the crystalline or crystallizable terminal chain and/or side chains in an amorphous complex macromolecular compound, according to the present invention, can be any group that can react with a functional group present on the amorphous polycondensation backbone. The functional group present on the polymer used for forming the terminal chain and/or side chains is preferably a hydroxyl, a carboxyl, a carboxylic acid halide, an alkali salt of a carboxylic acid, an epoxy, an isocyanate, a chloromethyl or an amine group. The polymer used for forming the crystalline or crystallizable terminal chain and/or side chains can also be terminated by a halogen bearing group that can react with the alkalimetal ion comprised in COOM or $SO_3M$ groups, comprised in the amorphous polycondensation backbone. Both in COOM and $SO_3M$, M is an alkali metal ion.

The polymer forming a terminal chains and/or side-chain is attached to said backbone polymer over a connecting group, preferably being a member selected from the group consisting of an ester of a carboxylic acid, an ester of a sulphonic acid, an ether, an amide of a carboxylic acid, an amide of a sulphonic acid, an urethane and an anhydride group.

It is preferred that the polymer used to form a terminal chain and/or side-chain polymer is a crystallizable polyolefine. Polyethylene is a more preferred polymer for forming the crystalline or crystallizable terminal chain and/or side chains in an amorphous complex macromolecular compound according to the present invention. In a further preferred embodiment, the polymer forming the terminal chain and/or side-chain is a polyethylene chain comprising alkoxy moieties.

It is most preferred that, in a method for producing the amorphous complex macromolecular compounds, according to the present invention, the amorphous polycondensation backbone polymer is a polyester and the reactive group(s) on said amorphous polycondensation backbone polymer are carboxyl groups that react under esterification with a terminal chain hydroxyl group of the polyolefinic chains or are hydroxyl groups that react under esterefication with a terminal carboxyl group of the polyolefinic chains.

In a further preferred embodiment, the polyolefic chain is a copolymer chain corresponding to the general formula (I):

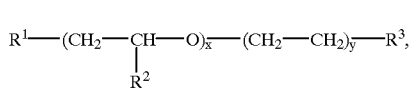

wherein $0 \leq x \leq 12$, $10 \leq y \leq 90$ and $R^1$ is a member selected from the group consisting of —OH, —COOH, —COCl, —NH$_2$,

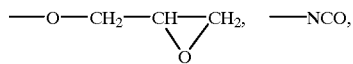

—O—CH$_2$—CHOH—CH$_2$Cl, —COO—CH$_2$—CHOH—CH$_2$Cl and COOM (with M is alkali metal ion), $R^2$ is CH$_3$ or H, preferably H, and $R^3$ is either C$_2$H$_5$ or CH$_3$.

Preferably $R^1$ is OH or COOH.

Examples of monofunctional, hydroxyl terminated polyolefinic polymers, very useful for forming the crystalline or crystallizable terminal chain and/or side chains in an amorphous complex macromolecular compound according to the present invention, are polyolefinic monoalcohols, commercially available as UNILIN 425, UNILIN 550, UNILIN 700, UNILIN 1000 and UNILIN 2000 (tradenames of PETROLITE, 6910 East 14th street, TULSA, Okla. 74112, USA for polyolefinic alcohols with average molecular weight of 425, 700, 1000 and 2000 respectively), or UNITHOX 720, a tradename for a hydroxyterminated, polyolefinicpolyoxyethylenic macromolecule, with average molecular weight of 875 of the same PETROLITE company. A typical example of a monofunctional carboxyl terminated polyolefine is UNICID 700 a tradename of PETROLITE for a polyolefinic monocarboxylic acid with average molecular weight of 700.

The amount of crystalline or crystallizable polymer that can be built into the amorphous polycondensation backbone is limited by the number of reactive groups on the amorphous polycondensation backbone polymer. In the preferred embodiment, where a polyester, with acid or hydroxyl value between 5 and 50 mg of KOH per g of polyester, is used, between $9.10^{-5}$ and $9.10^{-4}$ mol of the monofunctional crystallizable polymer can be built in pro g of amorphous polycondensation polymer. The percentage of the crystalline or crystallizable polymer (% by weight with respect to the weight of the polymer backbone) that can be built in depends on the molecular weight of the crystalline or crystallizable polymer. For a crystalline or crystallizable polymer with molecular weight 400 it ranges from 3, 5% to 35%, and for a crystalline or crystallizable polymer with molecular weight 4000 it can range from 35 to 350%.

Since the amorphous complex macromolecular compound comprising crystallizable terminal chains and/or sidechains is intended for use as toner resin, it has to be a basically amorphous complex macromolecular compound. Therefore the amount of crystalline or crystallizable polymer that is built into the amorphous polycondensation backbone is preferably limited to 1 to 50% by weight, more preferably between 1 and 25% by weight with respect to the total amorphous complex macromolecular compound.

It is not necessary, for an amorphous complex macromolecule according to this invention, that only one type of crystalline or crystallizable polymer is built into the amorphous polycondensation backbone, two or more different types of crystalline or crystallizable polymer can be used, as long a said crystallizable polymers have an average molecular weight by number ($M_{avg}$) so that $400 \leq M_{avg} \leq 4000$, a melting point between 50° C. and 150° C. and a melting range of at most 15° C.

The amorphous complex macromolecular compounds according to the present invention can be used as toner resin in the manufacture of toner particles that can be used in electrically or magnetically based imaging methods as, e.g. electro(photo)graphy, magnetography, direct electrostatic printing (DEP), ionography, etc. The macromolecules can be used as toner resin in toner particles for dry development as well as for liquid development. The amorphous complex macromolecular compounds, according to the present invention, can (when necessary for a specific imaging technique) be mixed with other known toner resins, both polycondensation resins and addition polymerized resins e.g. unmodigied polyesters, styreneacralate polymers, etc. Toner particles, comprising an amorphous complex macromolecular compound according to the present invention, can comprise any normal toner ingredient e.g. charge control agents, pigments both colored and black, anorganic fillers, etc. A description a charge control agents, pigments and other additives useful in toner particles, comprising an amorphous complex macromolecular compound according to the present invention, can be found in e.g. EP-A 601 235.

Toner particles, comprising an amorphous complex macromolecular compound according to the present invention, when used in a multicomponent dry developer can be mixed with any known carrier material. Known fluidity enhancers as e.g. hydrophobized silica, can be mixed with said toner particles. The toner particles can be used as a monocomponent dry developer or mixed with carrier particles to form a multi component developer. It is possible to produce toner particles, comprising an amorphous complex macromolecular compound, according to the present invention, as toner resin, by melt kneading procedures followed by milling, or by a suspension process wherein the toner resin and toner ingredients are dissolved in an organic solvent, the solution dispersed in a medium wherein said organic solvent is insoluble, and finally the organic solvent is evaporated.

Toner particles, comprising an amorphous complex macromolecular compound, according to the present invention, as toner resin can have an average diameter between 1 and 50 μm, preferably between 3 and 20 μm and more preferably between 3 and 10 μm. The particle size distribution of said toner particles can be of any type. It is however preferred to have a Gaussian or normal particle size distribution, either by number or volume, with a coefficient of variability (standard deviation divided by the average) (v) smaller than 0.5, more preferably of 0.3.

An amorphous complex macromolecular compound, according to the present invention, can favourably be used in a coated layer of a final substrate, offering the possibility to induce a very efficient fusing and wetting of the thereon deposited toner layer and this at still reasonable temperatures. Said toner layer can comprise toner particles comprising an amorphous complex macromolecular compound, according to the present invention, as toner resin as well as toner particles with other toner resins.

An amorphous complex macromolecular compound, according to the present invention, can favourably be used in a topcoat on a final image, e.g. applied by depositing a colorless toner compostion comprising said macromolecule.

The synthesis of the amorphous complex macromolecular compounds, according to the invention, can proceed in two different ways:

1. An amorphous polycondensation polymer, comprising reactive groups either terminal or within the polymer chain, is mixed with at least one crystalline or crystallizable polymer, comprising a functional group. The functional group on said at least one crystalline or crystallizable polymer is capable of reacting with the reactive groups on the amorphous polycondensation polymer. By this reaction the amorphous complex macromolecular compound, comprising an amorphous polycondensation backbone and crystalline or crystallizable polymer(s) attached to said amorphous polycondensation backbone, is formed.

The method comprises the steps of
(i) mixing an amorphous polycondensation polymer and at least one crystalline or crystallizable polymer, comprising a functional group and having an average molecular weight by number ($M_{avg}$) so that $400 \leq M_{avg} \leq 4000$, a melting point between 50° C. and 150° C. and a melting range of at most 15° C., in a reaction vessel
(ii) heating said mixture, under nitrogen atmosphere, to a temperature between 150° C. and 250° C. under stirring
(iii) continuing said heating until there is no longer a phase separation and
(iv) cooling and recovering the amorphous complex macromolecular compound.

The molten polymers are not miscible and form two distinct phases in the melt. The chemical reaction proceeds at the interface. After the formation of a few molecules of the amorphous complex molecular compound, comprising an amorphous polycondensation backbone and crystalline or crystallizable polymer(s) attached to said amorphous polycondensation backbone, the amorphous complex macromolecular compound acts as a kind of emulsifying agent for the reactants, and the reaction proceeds faster.

The reaction time is between 30 and 300 minutes depending on the reaction temperature.

After cooling of the reaction mixture the pure amorphous complex macromolecular compound, comprising an amorphous polycondensation backbone and crystalline polymer(s) attached to said amorphous polycondensation backbone, is obtained. There is no further need of purifying the reaction product, nor are there organic solvents that have to be recovered.

2. The crystalline or crystallizable polymer, comprising a reactive group, preferably a hydroxyl group or a carboxyl group, is mixed in the polycondensation mixture (di- or polycarboxylic acids, diols or polyols, if so desired diamines or lactams) for forming the amorphous polycondensation backbone and is thus copolycondensed in said backbone.

This method is comprises the steps of
(i) mixing at least one crytalline or crystallizable polymer, comprising a functional group and having an average molecular weight by number ($M_{avg}$) so that $400 \leq M_{avg} \leq 4000$, a melting point between 50° C. and 150° C. and a melting range of at most 15° C., with di- or polycarboxylic acids, diols or polyols, if so desired diamines or lactams or mixtures thereof to form a polycondensation mixture
(ii) forming a prepolymer by heating said polycondensation mixture, if so desired in the presence of proper catalysts,
(iii) further reacting the prepolymer with a di- or polyol and/or a di- or polycarboxylic acid until the desired visco-elasticity is reached and
(iv) cooling the reaction mixture and recovering the pure amorphous complex macromolecular compound.

The polycondensation is carried out in two steps. In a first step (step (ii) above), a low molecular weight prepolymer is formed by the direct polycondensation of the di- or polycarboxylic acids, the di- or polyols (preferably in this step only dicarboxylic acids and diols are used), and if so desired a diamine or lactam, and the crystalline or crystallizable polymer present in the reaction mixture. The reaction is carried out at elevated temperature, and, if so desired in the presence of proper catalysts, e.g. dibutyltindioxide, dibutyltindilaurate, zincoxide, stannous oxide as are described in EP-A 234 899.

In a second step (step (iii) above), the prepolymer is reacted further with a di- or polyol and/or a di- or polycarboxylic acid until the desired visco-elasticity is reached (in this step preferably polyols or polycarboxylic acids are used).

After cooling the reaction mixture the pure amorphous complex molecule, comprising an amorphous polycondensation backbone and crystalline polymer(s) attached to said amorphous polycondensation backbone, is obtained. There is no further need of purifying the reaction product, nor are there organic solvents that have to be recovered.

EXAMPLES

The glass transition temperature (Tg) mentioned in the examples is determined according to ASTM Designation: D 3418-82.

All viscosities mentioned in the examples are measured with a RHEOMETRICS dynamic rheometer, RVEM-200 (One Possumtown Road, Piscataway, N.J. 08854 USA).

All parts and percentages are by weight unless stated differently.

The monofunctional polyolefinic chains used in the examples are listed in table 1.

UNILIN, UNICID and UNITHOX are tradenames of of PETROLITE, 6910 East 14th street, TULSA, Okla. 74112, USA) for monofunctional polyolefines. UNILIN is the tradename for hydroxyterminated polyolefines, UNICID for carboxyl terminated polyolefines and UNITHOX for hydroxyterminated, polyolefinicpolyoxyethylenic macromolecules.

TABLE 1

| Name | Functional group | Chain* | $M_{avg}$ by number | $T_{melt}$ ° C. |
|---|---|---|---|---|
| UNILIN 425 | HO | —CH$_2$—CH$_2$— | 425 | 87.8 |
| UNILIN 700 | HO | —CH$_2$—CH$_2$— | 700 | 110 |
| UNILIN 1000 | HO | —CH$_2$—CH$_2$— | 1050 | 116.7 |
| UNILIN 2000 | HO | —CH$_2$—CH$_2$— | 1900 | 125.5 |
| UNITHOX 720 | HO | —CH$_2$—CH$_2$— and —C$_2$H$_4$—O— | 875 | 106 |
| UNICID 700 | COOH | —CH$_2$—CH$_2$— | 700 | 110 |

*:constituents of the polyolefinic chain.

Example 1

80 parts of an amorphous linear polyester of propoxylated bisphenol A and fumaric acid (ATLAC T500, a tradename of Atlas Chemical Industries Inc. Wilmington, Del. U.S.A.), having an acid value of 25 mg KOH/g and Tg of 52° C., were mixed, in a glass reactor, with 20 parts of UNILIN 700 (tradename), a monofunctional polyolefinic molecule, consisting of —CH$_2$—CH$_2$— groups terminated at one side with a —CH$_3$ group and at the other by a HO-group, having an average molecular weight of 700, and a melting point of 110° C.

The mixture was heated during 30 minutes at 245° C. and stirred by a nitrogen flow bubbling through the reaction mixture. During this reaction time the water, formed by the reaction was distilled away. Both polymers were, when molten, incompatible with each other and two separate phases existed in the reaction vessel. After about 5 minutes both phases started to mix and at the end of the reaction no seperate phases existed anymore, but a shiny homogeneous polymeric mass had been formed, indicating that the reaction was completed. After cooling the polymeric mass was recovered and the properties of the amorphous complex macromolecular compound (ACM1), formed during the reaction, were determined. The Tg of the amorphous complex macromolecular compound was 52° C.

The melt viscosity of the amorphous complex macromolecular compound (ACM1), formed during the reaction, was determined as a function of the temperature. The measurement proceeded in a RHEOMETRICS dynamic rheometer, RVEM-200 (One Possumtown Road, Piscataway, N.J. 08854 USA). The measurement procedure was the following: The polymer to be tested was crushed and sifted over a 100 μm sieve and a tablet was formed by pressing the crushed polymer under high pressure and vacuum. The tablet was inserted in the viscosity measuring apparatus in the gap between the cone and the plate. The sample was heated to 100° C. Starting from this temperature, the complex melt viscosity η* was measured in a temperature sweep starting from 100° C. to 140° C. with increments of 2° C., allowing one minute per 2° C. The measurement of η* proceeded at a frequency of 100 rad/sec and 1% strain. A plot of η* versus temperature for ACM1 is shown in the sole FIGURE, curve 1. In this plot a first gentle decrease in complex viscosity is seen, followed by a sharp decrease situated between 105° C. and 115° C., i.e. centered around the melting point of the crystalline monofunctional polyolefine; after this sharp drop, the curve flattens out again.

From this graph a factor F* is defined as follows:

$$F^* = \frac{\eta_1^*}{\eta_2^*}$$

wherein $\eta^*_1$ is the complex viscocity of the amorphous complex macromolecular compounds at 10° C. below the melting temperature ($T_{melt}$) of the crystalline polyolefinic polymer, introduced in the amorphous backbone polymer and $\eta^*_2$ is the complex viscocity of the amorphous complex macromolecular compounds at 10° C. above the melting temperature of the crystalline polyolefinic polymer, introduced in the amorphous backbone polymer. The higher F*, the sharper the viscosity drop. In this case $T_{melt}$=110° C. and F*=104.

Comparative Example 1

100 parts of an amorphous linear polyester of propoxylated bisphenol A and fumaric acid (ATLAC T500, tradename) were heated, in a glass reactor, as in example 1, but NO crystalline or crystallizable monofunctional polyolefinic molecule was added. After 30 minutes heating at 245° C. the polymer was cooled and the viscosity measured as described in example 1. The curve of η* versus temperature is shown in the sole FIGURE, curve 2. The calculation of F*, was carried out taking the melting temperature of UNILIN 700 (tradename) as reference for Tmelt and yielded a value of 5.55. It is thus clear, from example 1 and comparative example 1, that the introduction of crystalline polyolefinic blokes in an amorphous polycondensation backbone does introduce a sharp drop in melt viscosity in the resulting amorphous complex macromolecular compound (ACM1), while this macromolecule has a Tg comparable to the Tg of the polycondensation backbone.

Example 2

Two toners were prepared, one using polymer ACM1 (an amorphous complex macromolecular compound according to example 1 of the present invention as binder resin and one using an amorphous linear polyester of propoxylated bisphenol A and fumaric acid (ATLAC T500, tradename) as binder resin.

Toner1: 97 parts by weight of ACM1 (the amorphous complex macromolecular compound of example 1) and 3 parts by weight of HELIOGEN BLAU (tradename of BASF, Germany for Cu-phthalocyanine) were intimately mixed together, placed in a melt kneader and heated to 120° C. to form a melt. This melt was melt kneaded for 20 minutes. Thereafter the mixture was allowed to cool to room temperature (20° C.). At that temperature the mass was crushed and classified to give toner particles with average particle size of 8.5 μm based on volume, and with average particles size of 6.5 μm based on number, when measured with a COULTER COUNTER (registered trade mark) Model TA II particle size analyzer operating according to the principles of electrolyt displacement in narrow aperture and marketed by COULTER ELECTRONICS Corp. Northwell Drive, Luton, Bedfordshire, LC 33, UK.

Toner2: The toner was prepared as toner 1, but instead of 97 parts of ACM1, 97 parts of a linear polyester of propoxylated bisphenol A and fumaric acid (ATLAC T500, tradename), after being treated for 30 minutes at 245° C. as described in comparative example 1, was used as binder resin.

Both toners were combined with a ferrite carrier to form 2 two component developers. Each of these developers was used to form an image in an electrostatographic device comprising a heat fixing step. The fusing properties were observed. It was observed that the toner particles of toner1, comprising ACM1 as toner resin could be fused at a temperature that was 15° C. lower than the fusing temperature of the comparison toner (toner2). This is in accordance with the observed differences in melt behaviour of the two toner resins.

Example 3

The reaction of example 1 was repeated except for the ratio of the reactants. 90 parts of the amorphous linear polyester (ATLAC T500, tradename) and 10 parts of the monofunctional polyolefine (UNILIN 700, tradename) were used.

The amorphous complex macromolecular compound of this example had a factor $F^*$ of 10 and a Tg of 54° C.

Example 4

The reaction of example 1 was repeated except for the ratio of the reactants. 70 parts of the amorphous linear polyester (ATLAC T500, tradename) and 30 parts of the monofunctional polyolefine (UNILIN 700, tradename) were used.

The amorphous complex macromolecular compound of this example had a factor $F^*$ of 240 and a Tg of 50° C.

Example 5

Example 1 was repeated, but with UNILIN 425 (tradename), having an average molecular weight of 425, and a melting point of 87.8° C.

The resulting amorphous complex molecule was very soft and had a Tg of only 38° C. Therefore the amorphous complex macromolecular compound was only in a limited way useful as toner resin.

Example 6

Example 1 was repeated, but with UNILIN 1000 (tradename), having an average molecular weight of 1000, and a melting point of 116.7° C.

The factor $F^*$ of the amorphous complex macromolecular compound was 53 and its Tg was 53° C.

Example 7

Example 1 was repeated, except for the polyester and the reaction time, that was, for the complex macromolecule of this example, 60 minutes. As polycondensation backbone a polyester prepared by the polycondensation of 65 mol % of terephathalic acid, 35 mol % of isophtalic acid, 40 mol % of diethoxylated bishpenol A and 60 mol % of ethylene glycol was used. This polyester had a Tg of 58° C. and an acid value of 20 mg KOH/g of polyester. It was reacted with 20 parts of UNILIN 700 (tradename).

The amorphous complex macromolecular compound of this example had a factor $F^*$ of 15.1 and a Tg of 60° C.

Comparative Example 2

To the polyester used in example 7, NO reactive polyolefinic molecule was added, but the polyester alone was heated for 60 minutes.

The factor $F^*$ of this polymer was 6.5, again lower than the factor $F^*$ of the same polyester comprising crytalline polyolefinic blocks as produced in example 7.

Example 8

The procedure of example 1 was repeated again, but instead of an amorphous linear polyester, 80 parts of a branched polyester polycondensed by the reaction of 0.42 mol of terephthalic acid, 0.28 mol of trimellitic acid, 0.30 mol of diethoxylated bisphenol A and 0.7 mol of dipropoxylated bisphenol A, having a Tg of 65° C. and an acid value of 30 mg KOH/g, were used in the reaction with 20 parts of UNILIN 700 (tradename). The reaction time was extended to 180 minutes.

The amorphous complex macromolecular compound of this example had a factor $F^*$ of 15.2 and a Tg of 66° C.

Comparative Example 3

To the polyester used in example 8, NO reactive polyolefinic molecule was added, but the polyester alone was heated for 180 minutes.

The factor $F^*$ of this polymer was 5.1, again lower than the factor $F^*$ of the same polyester comprising crytalline polyolefinc blocks as produced in example 8.

Example 9

Example 8 was repeated except that 10 parts of UNILIN 700 (tradename) and 90 parts of the amorphous branched polyester were used and reacted for 30 minutes.

The amorphous complex macromolecular compound of this example had a factor $F^*$ of 8.6 and a Tg of 59° C.

Example 10

Example 9 was repeated except that instead of 10 parts of UNILIN 700 (tradename), 10 parts of UNILIN 1000 (tradename) were reacted with 90 parts of the amorphous branched polyester. The amorphous complex macromolecular compound of this example had a factor $F^*$ of 13.6 and a Tg of 61° C.

Example 11

Example 9 was repeated except that instead of 10 parts of UNILIN 700 (tradename), 10 parts of UNILIN 2000 (tradename) were reacted with 90 parts of the amorphous branched polyester for 30 minutes.

The amorphous complex macromolecular compound of this example had a factor $F^*$ of 11.3 and a Tg of 63° C.

Example 12

Example 9 was repeated except that instead of 10 parts of UNILIN 700 (tradename), 10 parts of UNITHOX 720 (tradename) were reacted with 90 parts of the amorphous branched polyester.

The amorphous complex macromolecular compound of this example had a factor $F^*$ of 11.5 and a Tg of 60° C.

Example 13

Example 9 was repeated except that instead of 10 parts of UNILIN 700 (tradename), 10 parts of UNICID 700 (tradename) were reacted with 90 parts of the branched amorphous polyester.

The amorphous complex macromolecular compound of this example had a factor $F^*$ of 8.0 and a Tg of 59° C.

Example 14

Example 13 was repeated except that instead of 90 parts of the amorphous branched polyester, 90 parts of a linear adduct of bisphenol-A and epichlorhydrin (EPIKOTE 1004, tradename of the Shell Chemical Co), with molecular weight by number of 1900 and Tg of 54° C. were used. The reaction time was again 30 minutes.

The amorphous complex macromolecular compound of this example had a factor F* of 17.1.

Comparative Example 4

A linear adduct of bisphenol-A and epichlorhydrin (EPIKOTE 1004, tradename of the Shell Chemical Co), with molecular weight by number of 1900 and Tg of 54° C. was heated, for 30 minutes, without addition of a crystallizable or crystalline polymer.

The factor F* was 11.1.

Example 15

An amorphous complex macromolecular compound was prepared by copolycondensation 51.6 g (0.15 mol) of DIANOL 33 (tradename), 23.7 g (0.075 mol) of DIANOL 22 (tradename), 17.5 g (0.025 mol) of UNILIN 700 (tradename) (i.e. 15% by weight of UNILIN 700 with respect to the final amorphous complex macromolecular compound), 17.45 g of terephthalic acid (0.105 mol) and 17.45 mg of dibutyltinoxide. The reactants and the catalyst were mixed under nitrogen atmosphere and heated to 280° C. The reaction started immediately and the reaction water was distilled away. After one hour the esterification of the terphthalic acid was complete. The reaction mixture was cooled to 220° C. and 13.45 g (0.07 mol) of trimellitic acid anhydride was added. The reaction was carried on for between 3 and 4 hours until the desired viscosity was reached. The mixture was cooled and the amorphous complex macromolecular compound recovered. The amorphous complex macromolecular compound of this example had a factor F* of 15.2 and a Tg of 64° C.

Example 16

A 100 μm thick, subbed polyethylene terephthalate film, was coated with a 2 μm thick layer of amorphous complex macromolecular compound ACM1, giving material TRX1 and another 100 μm thick, subbed polyethylene terephthalate film, was coated with a 2 μm thick layer of a linear polyester (ATLAC T500, tradename), giving material TRX2. Both materials were used as receiver sheets for image formation in an AGFA COLOR COPIER XC305 (tradename), with commercial toners. Both images were fused at 120° C. It was observed that the colors in the final image on TRX1 were more vivid and saturated than in the final image of TRX2.

We claim:

1. Dry toner particles comprising a toner resin, wherein said toner resin is an amorphous complex macromolecular compound that comprises in its macromolecular structure
   (i) an amorphous polycondensation backbone, the corresponding backbone polymer (A) having a Tg of at least 45° C.
   (ii) at least two different polymer chains (B) attached to said backbone, either terminally and/or in a side-chain, said polymer chains (B) each being derived from a polymer which on itself has an average molecular weight by number ($M_{avg}$) so that $400 \leq M_{avg} \leq 4000$, a melting point between 50° C. and 150° C.

2. Dry toner particles according to claim 1, wherein said polymer chains (B) have an average molecular weight by number ($M_{avg}$) so that $500 \leq M_{avg} \leq 2500$.

3. Dry toner particles according to claim 1, wherein said polymer chains (B) have a melting point of at least 75° C. and at most 125° C.

4. Dry toner particles according to claim 1, wherein said polymer chains (B) are attached to said backbone polymer (A) over a connecting group being a member selected from the group consisting of an ester of a carboxylic acid, as ester of a sulphonic acid, an ether, and amide of a carboxylic acid, an amide of a sulphonic acid, an urethane and an anhydride group.

5. Dry toner particles according to claim 1, wherein $R^1$ is OH or COOH, $R^2$ is H and $R^3$ is $C_2H_5$.

6. Dry toner particles according to claim 1, wherein said polymer chains (B) are present in an amount from at least 1% and at most 25% by weight with respect to said backbone polymer (A).

7. Dry toner particles according to claim 1, wherein said amorphous polycondensation backbone polymer (A) is a member selected from the group consisting of a homo- or copolyester, an epoxy resin and a mixed polycondensate (block or random polymer) comprising polyester and polyamide moieties.

8. Dry toner particles according to claim 1, wherein said amorphous polycondensation backbone polymer (A) is a polyester having an acid value between 5 and 50 mg KOH per g of polyester.

9. Dry toner particles according to claim 1, wherein each of said at least two different polymer chains (B) has a melting range of at most 15° C.

10. An amorphous macromolecular compound that comprises in its macromolecular structure,
    (i) an amorphous polycondensation backbone, the corresponding backbone polymer (A) having a Tg of at least 45° C. and
    (ii) at least two different polymer chains being attached to said backbone, either terminally and/or in a side-chain, said polymers each being derived from a polymer which on itself has an average molecular weight by number ($M_{avg}$) so that $400 \leq M_{avg} \leq 4000$ and a melting point between 50° C. and 150° C.

11. An amorphous macromolecular compound according to claim 9, wherein each of said at least two different polymer chains (B) has a melting range of at most 15° C.

12. A toner receiving web or sheet material comprising a toner receiving layer, said receiving layer containing an amorphous complex macromolecular compound having in its macromolecular structure,
    (i) an amorphous polycondensation backbone, the corresponding backbone polymer (A) having a Tg of at least 45° C. and
    (ii) at least one polymer chain (B) being attached to said polymer backbone, either terminally and/or in a side-chain, said polymer chain (B) being derived from a polymer which on itself has an average molecular weight by number ($M_{avg}$) so that $400 \leq M_{avg} \leq 4000$, a melting point between 50° C. and 150° C. and a melting range of at most 15° C.

13. A toner receiving web or sheet material comprising a toner receiving layer, said receiving layer containing an amorphous complex macromolecule compound having in its macromolecular structure,
    (i) an amorphous polycondensation backbone, the corresponding backbone polymer (A) having a Tg of at least 45° C. and (ii) at least two polymer chains (B) being attached to said backbone, either terminally and/or in a side-chain, each of said polymer chains (B) being derived from a polymer which on itself has an average molecular weight by number ($M_{avg}$) so that $400 \leq M_{avg} \leq 4000$, a melting point between 50° C. and 150° C. and a melting range of at most 15° C.

* * * * *

UNITED STATES PATENT AND TRADEMARK OFFICE
CERTIFICATE OF CORRECTION

PATENT NO. : 5,981,128
DATED : November 9, 1999
INVENTOR(S) : Serge Tavernier et al It is certified that error appears in the above-indentified patent and that said Letters Patent is hereby corrected as shown below:

Claim 11, Column 20, line 45, "claim 9," should read --claim 10,--.

Signed and Sealed this

Tenth Day of April, 2001

*Attest:*

NICHOLAS P. GODICI

*Attesting Officer*     *Acting Director of the United States Patent and Trademark Office*